US006932334B1

(12) United States Patent
Gregory

(10) Patent No.: US 6,932,334 B1
(45) Date of Patent: Aug. 23, 2005

(54) DEVICE FOR SUPPORTING DUCTWORK DURING INSTALLATION

(76) Inventor: Garroll C. Gregory, 3293 Charmil Dr., Manchester, MD (US) 21102

( * ) Notice: Subject to any disclaimer, the term of this patent is extended or adjusted under 35 U.S.C. 154(b) by 117 days.

(21) Appl. No.: 10/678,396

(22) Filed: Oct. 6, 2003

(51) Int. Cl.[7] ................................................ B23Q 1/00
(52) U.S. Cl. ....................................................... 269/46
(58) Field of Search .............................. 52/29; 248/59, 248/72, 210, 317, 323, 327, 288.6, 288.7; 269/45, 46, 69, 152, 296

(56) References Cited

U.S. PATENT DOCUMENTS

D126,411 S * 4/1941 Audette
2,282,624 A * 5/1942 Upson et al.
3,718,307 A * 2/1973 Albanese
5,024,403 A * 6/1991 Carlston
6,202,969 B1 * 3/2001 Orr
6,296,211 B1 * 10/2001 Snyder

* cited by examiner

*Primary Examiner*—Robert C. Watson
(74) *Attorney, Agent, or Firm*—Donald R. Schoonover

(57) ABSTRACT

A device is attached to a building structural element adjacent to a position where ductwork will be installed and is used to support that ductwork during installation. One worker can thus install long sections of ductwork without requiring assistance of other workers to support the ductwork. The device is collapsible and is adjustable and includes at least one clamp element.

2 Claims, 2 Drawing Sheets

DEVICE FOR SUPPORTING DUCTWORK DURING INSTALLATION

BACKGROUND OF THE INVENTION

1. Field of the Invention

The present invention relates to the general art of supports, and to the particular field of supports used in the building industry.

2. Discussion of the Related Art

Ductwork is often used in buildings to transfer air, conduits and the like. This ductwork is often shipped in long sections that exceed the length of a worker's reach. Often, these long sections of ductwork must be mounted in difficult to reach areas, including overhead ceilings and the like. Handling such long sections of ductwork may be cumbersome and difficult, especially for one worker.

Therefore, installation of ductwork often requires more than one worker. One worker supports the ductwork while the other worker mounts the ductwork in place. This can be a time consuming job and since more than one worker is involved, the job may become expensive. Often, it is not practical for two or more workers to devote time to installing ductwork. This may require delaying the installation of ductwork until a plurality of workers are available. This may have adverse effects on a building schedule. Also, a self-employed worker may have to hire extra help, which he may not otherwise need, to install ductwork. This may not be cost-effective.

Therefore, there is a need for a means which can be used to support ductwork so one worker can install long sections of ductwork without requiring the assistance of other workers.

Many buildings have varying dimensions adjacent to the ductwork locations. Accordingly, any device which is used in connection with ductwork must be easily adaptable to various dimensions.

Therefore, there is a need for a means which can be used to support ductwork so one worker can install long sections of ductwork without requiring the assistance of other workers and which is easily and quickly adjustable.

Furthermore, since space is often at a premium, and time is valuable, any tool or device used in the installation of ductwork should be easily stored and amenable to being placed in a condition for storage, yet which will be easy and quick to deploy into a use configuration.

Therefore, there is a need for a means which can be used to support ductwork so one worker can install long sections of ductwork without requiring the assistance of other workers and which is easy and quick to deploy into a use and/or a stored configuration.

Therefore, there is a need for a means which can be used to support ductwork so one worker can install long sections of ductwork without requiring the assistance of other workers and which provides the worker with an option of supporting the device using fasteners or clamps.

PRINCIPAL OBJECTS OF THE INVENTION

It is a main object of the present invention to provide a means which can be used to support ductwork so one worker can install long sections of ductwork without requiring the assistance of other workers.

It is another object of the present invention to provide a means which can be used to support ductwork so one worker can install long sections of ductwork without requiring the assistance of other workers and which is easily and quickly adjustable.

It is another object of the present invention to provide a means which can be used to support ductwork so one worker can install long sections of ductwork without requiring the assistance of other workers and which is easy and quick to deploy into a use and/or a stored configuration.

It is another object of the present invention to provide a means which can be used to support ductwork so one worker can install long sections of ductwork without requiring the assistance of other workers and which provides the worker with an option of supporting the device using fasteners or clamps.

SUMMARY OF THE INVENTION

These, and other, objects are achieved by a support device for use in hanging ductwork which comprises a body unit adapted to support ductwork thereon while that ductwork is being installed in a building, the body unit including a central section, a first end section telescopingly attached to the central section, and a second end section telescopingly attached to the central section; a first leg section pivotally attached to the first end section; a second leg section pivotally attached to the second end section; a first attachment element on the first leg section, the first attachment element being adapted to mount on a building structural element adjacent to a position whereat ductwork will be installed; and a second attachment element on the first leg section, the second attachment element being adapted to mount on a building structural element adjacent to a position whereat ductwork will be installed. The device further includes a ducthanger clamp having an attachment element engaging element and knurling, with the knurling being adapted to engage a floor joist to support an associated leg on the floor joist.

The device embodying the present invention is easily deployed and is adaptable to different sizes so it can be efficiently stored and deployed. Once deployed, it efficiently and effectively supports ductwork so one worker can install long sections of ductwork without requiring assistance. The device further provides a user with the option of supporting the device on a floor joist using nails or other fasteners or by using clamps.

BRIEF DESCRIPTION OF THE DRAWING FIGURES

DETAILED DESCRIPTION OF THE PREFERRED EMBODIMENT

Figure 2:
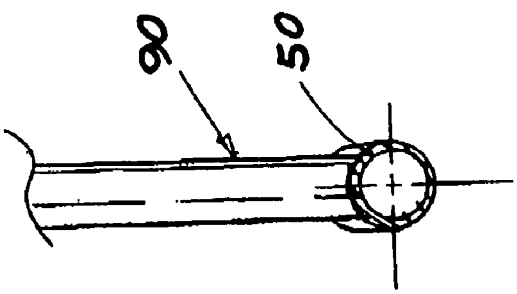
FIG. 2 is a sectional view taken along line 2—2 of FIG. 1.

Other objects, features and advantages of the invention will become apparent from a consideration of the following detailed description and the accompanying drawings.

Referring to the Figures, it can be understood that the present invention is embodied in a support device 10 for use in hanging ductwork D on a building. Ductwork D is shown in dotted lines in FIG. 1 and is of undefined length. The ductwork can be of any suitable size and shape as will occur to those skilled in the art based on the teaching of this disclosure.

Device 10 comprises a body unit 12 adapted to support ductwork D thereon while that ductwork is being installed in a building. Body unit 12 includes a tubular section 14 which has a first end 16, a second end 18, and a longitudinal axis 20 which extends between the first end 16 of the tubular section 14 and the second end 18 of the tubular section 14. A bore 22 extends between the first end 16 of the tubular section 14 and the second end 18 of the tubular section 14 and has an inner dimension 26 measured across the bore 22. A plurality of snap locking elements, such as snap locking element 28, are located on the tubular section 14.

Figure 1:
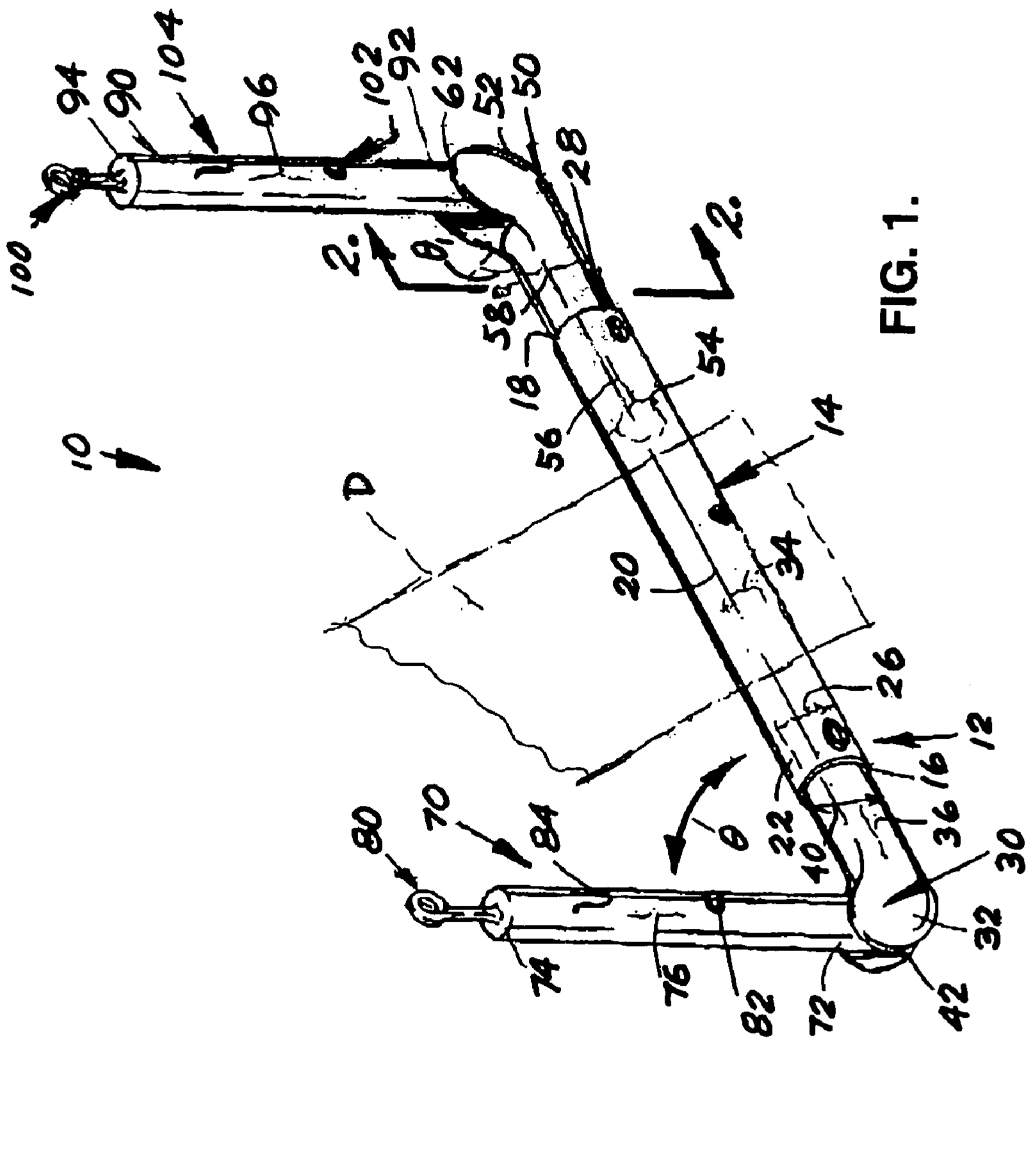
FIG. 1 is a perspective view of a device for supporting ductwork and which embodies the present invention.

A first end section 30 has a first end 32, a second end 34, and a longitudinal axis 36 which extends between the first end 32 of the first end section 30 and the second end 34 of the first end section 30. Longitudinal axis 36 of the first end section 30 is aligned with the longitudinal axis 20 of the tubular section 14 when the first end section 30 is in place coupled to the first end 16 of the tubular section 14 as shown in FIG. 1. The first end section 30 has an outer dimension 40 which is smaller than the inner dimension 26 of the tubular section 14 and is telescopingly accommodated in the tubular section 14 adjacent to the first end 16 of the tubular section 14 in the use condition shown in FIG. 1. The first end section 30 further has a pivot joint 42 on the first end 32 of the first end section 30. The snap locking elements 28 on the tubular section 14 engage the first end section 30 to hold the first end section 30 coupled to the tubular section 14. However, the snap locking elements 28 can be easily released to release the first end section 30 from the tubular section 14 to dismantle device 10 for storage as can be understood by one skilled in the art based on the teaching of this disclosure. The plurality of snap locking elements 28 permits the device 10 to adopt various sizes to accommodate different building dimensions as required.

A second end section 50 has a first end 52, a second end 54, and a longitudinal axis 56 which extends between the first end 52 of the second end section 50 and the second end 54 of the second end section 50. Longitudinal axis 56 of the second end section 50 is aligned with the longitudinal axis 20 of the tubular section 14 when the second end section 50 is in place coupled to the second end 18 of the tubular section 14 as shown in FIG. 1. The second end section 50 has an outer dimension 58 which is smaller than the inner dimension 26 of the tubular section 14 and is telescopingly accommodated in the tubular section 14 adjacent to the second end 18 of the tubular section 14 in the use condition shown in FIG. 1. The second end section 50 further has a pivot joint 62 on the first end 52 of the second end section 50. The second end section 50 also has a plurality of snap lock elements to releasably lock the second end section 50 to the tubular section 14 for use. The snap lock elements on the end sections 30, 50 correspond in operation to the snap lock elements 28 on the tubular section 14 and are placed to allow device 10 to be sized according to the needs of a specific job.

A first leg section 70 has a first end 72, a second end 74, and a longitudinal axis 76 which extends between the first end 72 of the first leg section 70 and the second end 74 of the first leg section 70. The second end 74 of the first leg section 70 is pivotally connected to the pivot joint 42 on the first end 32 of the first end section 30. The first leg section 70 further includes an eyelet element 80 on the second end 74 of the first leg section 70. Eyelet element 80 on the first leg section 70 is adapted to be attached to a building element to support the first leg section 70 in place on the building element. The first leg section 70 further includes at least one snap lock element 82 and at least one hanger element 84 mounted thereon. The first leg section 70 is movable between a first position having the longitudinal axis 76 of the first leg section 70 oriented perpendicular to the longitudinal axis 36 of the first end section 30 as shown in FIG. 1 and a second position having the longitudinal axis 76 of said first leg section 70 oriented at an oblique angle, θ, to the longitudinal axis 36 of the first end section 30. The hanger elements 84 can be used to attach the device 10 to elements on the building as convenient. Thus, the device 10 is very versatile and can be used in connection with nearly any building situation.

A second leg section 90 has a first end 92, a second end 94, and a longitudinal axis 96 which extends between the first end 92 of the second leg section 90 and the second end 94 of the second leg section 90. The second end 94 of the second leg section 90 is pivotally connected to the pivot joint 62 on the first end 52 of the second end section 50. The second leg section 90 further includes an eyelet element 100 on the second end 94 of the second leg section 90. Eyelet element 100 on the second leg section 90 is adapted to be attached to a building element to support the second leg section 90 in place on the building element. Second leg section 90 further includes at least one snap lock element 102 and at least one hanger element 104 mounted thereon. The second leg section 90 is movable between a first position shown in FIG. 1 having the longitudinal axis 96 of the second leg section 90 oriented perpendicular to the longitudinal axis 56 of the second end section 50 and a second position having the longitudinal axis 96 of the second leg section 90 oriented at an oblique angle, $\theta_1$, to the longitudinal axis 56 of the second end section 50.

Figure 3:
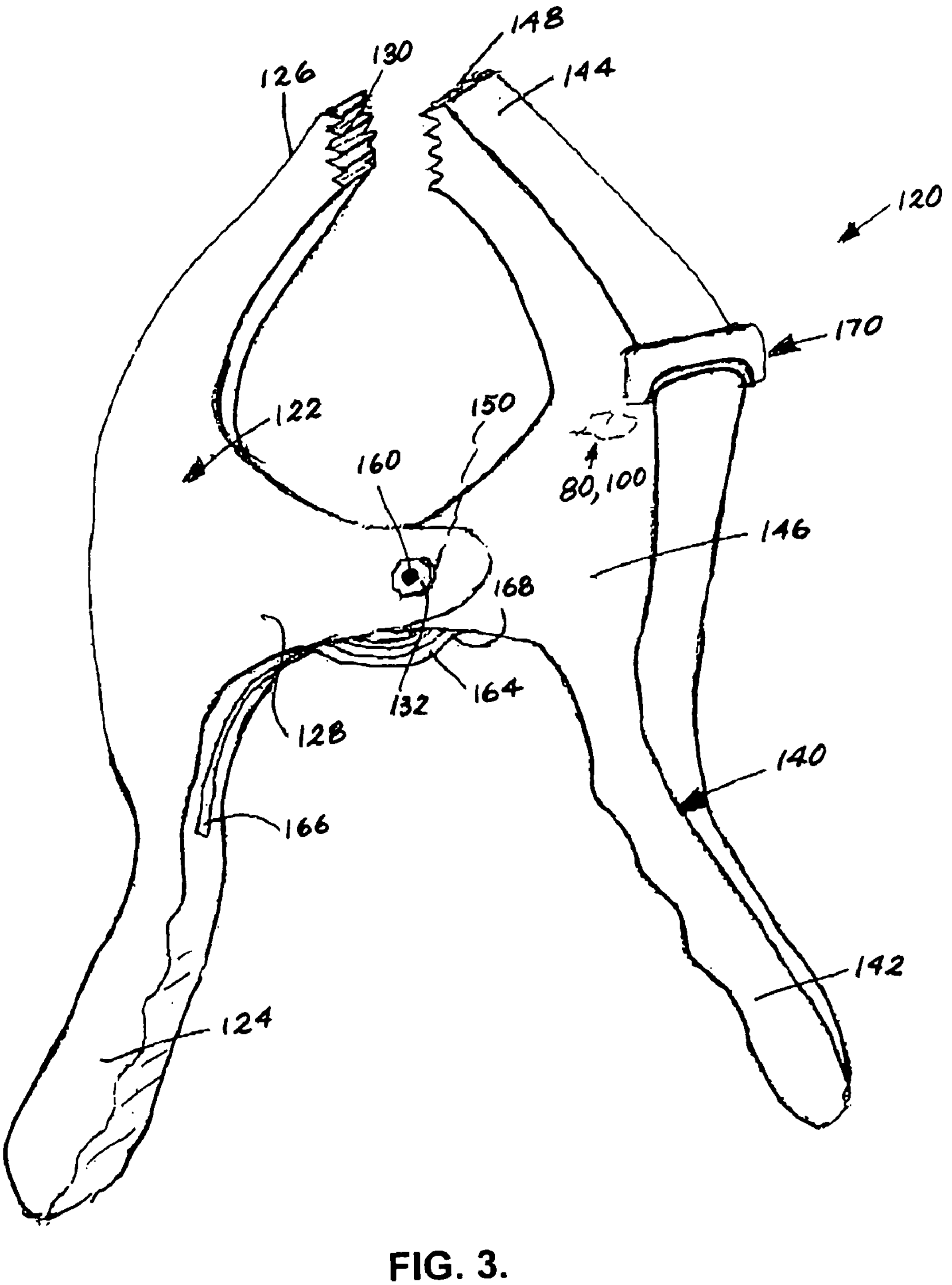
FIG. 3 is a perspective view of a ducthanger clamp included in the device embodying the present invention.

As shown in FIG. 3, the device of the present invention further includes a ducthanger clamp 120 which includes a first handle section 122 having a handgrip end 124, a floor joist-engaging end 126, and a pivot section 128 which is located between the handgrip end 124 and the floor joist-engaging end 126. Knurling 130 is located on the floor joist-engaging end 126 and a pivot pin-accommodating hole 132 is defined through the pivot section 128. A second handle section 140 has a handgrip end 142, a floor joist-engaging end 144, and a pivot section 146 which is located between the handgrip end 142 of the second handle section 140 and the floor joist-engaging end 144 of the second handle section 140. Knurling 148 is located on the floor joist-engaging end 144 of the second handle section 140, and a pivot pin-accommodating hole 150 is defined through the pivot section 146 of the second handle section 140.

A pivot pin 160 extends through the pivot pin-accommodating hole 132 on the first handle section 122 and through the pivot pin-accommodating hole 150 on the second handle section 140.

A spring 164 is mounted on the pivot pin and has a first end 166 engaging the first handle section 122 and a second end 168 engaging the second handle section 140. An eyelet element-engaging element 170 is located on the second handle section 140 near the pivot section 146 of the second handle section 140.

The knurling 130 on the first handle section 122 and the knurling 148 on the second handle section 140 are adapted to engage a floor joist and support an associated leg section on the floor joist via the eyelet element on the associated leg section whereby the user can choose between the eyelet element or the clamps to support the device as suitable depending on the load and/or the weight of the duct. The duct hanger hooks onto the clamps and all of the weight of the duct and the duct hanger is held to the floor joist. There can be two ducthanger clamps, one for each leg of the device.

It is to be understood that while certain forms of the present invention have been illustrated and described herein, it is not to be limited to the specific forms or arrangements of parts described and shown.

What is claimed and desired to be covered by Letters Patent is:

1. A support device for use in hanging ductwork comprising:

a) a body unit adapted to support ductwork thereon while that ductwork is being mounted in a building, said body unit including (1) a tubular section having a first end, a second end, a longitudinal axis extending between the first end of the tubular section and the second end of the tubular section, a bore extending between the first end of the tubular section and the second end of the tubular section, a plurality of snap locking elements on the tubular section, and an inner dimesion measured across the bore;

(2) a first end section having a first end, a second end, a longitudinal axis extending between the first end of the first end section and the second end of the first end section, the longitudinal axis of the first end section being aligned with the longitudinal axis of the tubular section when the first end section is in place coupled to the first end of the tubular section, the first end section having an outer dimension which is smaller than the inner dimension of the tubular section and being telescopingly accommodated in the tubular section adjacent to the first end of the tubular section, the first end section further having a pivot joint on the first end of the first end section; and (3) a second end section having a first end, a second end, a longitudinal axis extending between the first end of the second end section and the second end of the second end section, the longitudinal axis of the second end section being aligned with the longitudinal axis of the tubular section when the second end section is in place coupled to the second end of the tubular section, the second end section having an outer dimension which is smaller than the inner dimension of the tubular section and being telescopingly accommodated in the tubular section adjacent to the second end of the tubular section, the second end section further having a pivot joint on the first end of the second end section;

b) a first leg section having a first end, a second end, a longitudinal axis extending between the first end of the first leg section and the second end of the first leg section, the second end of the first leg section being pivotally connected to the pivot joint on the first end of the first end section, said first leg section further including an eyelet element on the second end of the first leg section, the eyelet element on the first leg section being adapted to be attached to a building element to support said first leg section in place on the building element, said first leg section further including at least one snap lock element and at least one hanger element mounted thereon, said first leg section being movable between a first position having the longitudinal axis of said first leg section oriented perpendicular to the longitudinal axis of the first end section and a second position having the longitudinal axis of said first leg section oriented at an oblique angle to the longitudinal axis of the first end section; and c) a second leg section having a first end, a second end, a longitudinal axis extending between the first end of the second leg section and the second end of the second leg section, the second end of the second leg section being pivotally connected to the pivot joint on the first end of the second end section, said second leg section further including an eyelet element on the second end of the second leg section, the eyelet element on the second leg section being adapted to be attached to a building element to support said second leg section in place on the building element, said second leg section further including at least one snap lock element and at least one hanger element mounted thereon, said second leg section being movable between a first position having the longitudinal axis of said second leg section oriented perpendicular to the longitudinal axis of the second end section and a second position having the longitudinal axis of said second leg section oriented at an oblique angle to the longitudinal axis of the second end section; and d) a ducthanger clamp which includes (1) a first handle section having a handgrip end, a floor joist-engaging end, and a pivot section between the handgrip end and the floor joist-engaging end, knurling on the floor joist engaging end, and a pivot pin-accommodating hole defined through the pivot section;

(2) a second handle section having a handgrip end, a floor joist-engaging end, and a pivot section between the handgrip end of the second handle section and the floor joist-engaging end of the second handle section, knurling on the floor joist-engaging end of the second handle section, and a pivot pin-accommodating hole defined through the pivot section of the second handle section;

(3) a pivot pin extending through the pivot pin-accommodating hole on the first handle section and through the pivot pin-accommodating hole on the second handle section;

(4) a spring mounted on the pivot pin and having a first end engaging the first handle section and a second end engaging the second handle section; and (5) an eyelet element-engaging element on the second handle section near the pivot section of the second handle section (6) the knurling on the first handle section and the knurling on the second handle section being adapted to engage a floor joist and support an associated leg section on the floor joist via the eyelet element on the associated leg section.

2. A support device for use in hanging ductwork comprising:

a) a body unit adapted to support ductwork thereon while that ductwork is being mounted in a building, said body unit including (1) a central section;

(2) a first end section telescopingly attached to the central section; and (3) a second end section telescopingly attached to the central section;

b) a first leg section pivotally attached to the first end section;

c) a second leg section pivotally attached to the second end section;

d) a first attachment element on the first leg section, said first attachment element being adapted to mount on a building structural element adjacent to a position whereat ductwork will be mounted; and e) a second attachment element on the first leg section, said second attachment element being adapted to mount on a building structural element adjacent to a position whereat ductwork will be mounted; and f) a ducthanger clamp having an attachment element-engaging element and knurling, with the knurling being adapted to engage a floor joist to support an associated leg on the floor joist.

* * * * *